(12) United States Patent
Barton et al.

(10) Patent No.: US 10,066,731 B2
(45) Date of Patent: Sep. 4, 2018

(54) BEARING SYSTEM AND GEAR UNIT (71) Applicant: SEW-EURODRIVE GMBH & CO. KG, Bruchsal (DE)

(72) Inventors: Peter Barton, Bretten (DE); Stefan Dietrich, Karlsruhe (DE); Renaud Becker, Scheibenhard (FR); Markus Wöppermann, Karlsbad (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 394 days.

(21) Appl. No.: 14/766,345

(22) PCT Filed: Jan. 29, 2014

(86) PCT No.: PCT/EP2014/000235
§ 371 (c)(1),
(2) Date: Aug. 6, 2015

(87) PCT Pub. No.: WO2014/121906
PCT Pub. Date: Aug. 14, 2014

(65) Prior Publication Data
US 2015/0377339 A1  Dec. 31, 2015

(30) Foreign Application Priority Data
Feb. 7, 2013 (DE) .......... 10 2013 002 050

(51) Int. Cl.
*F16H 57/031* (2012.01)
*F16C 33/76* (2006.01)
(Continued)

(52) U.S. Cl.
CPC ......... *F16H 57/031* (2013.01); *F16C 33/768* (2013.01); *F16H 57/021* (2013.01);
(Continued)

(58) Field of Classification Search
CPC .................... F16H 57/031; F16C 33/768
See application file for complete search history.

(56) References Cited

U.S. PATENT DOCUMENTS

| | | | | |
|---|---|---|---|---|
| 3,710,646 A | * | 1/1973 | Bogan .................. | F16H 57/028 105/140 |
| 4,020,715 A | * | 5/1977 | Sollars ..................... | F16H 1/16 74/425 |
| 2005/0241436 A1 | * | 11/2005 | Leimann .............. | F16H 57/029 74/606 R |

FOREIGN PATENT DOCUMENTS

| | | |
|---|---|---|
| CN | 201 090 612 | 7/2008 |
| CN | 202 326 924 | 7/2012 |

(Continued)

OTHER PUBLICATIONS

International Preliminary Report on Patentability, dated Aug. 20, 2015, issued in corresponding International Application No. PCT/EP2014/000235.

(Continued)

*Primary Examiner* — Terence Boes
(74) *Attorney, Agent, or Firm* — Hunton Andrews Kurth LLP (57) ABSTRACT

A bearing system having a housing component, a shaft being supported in the housing component with the aid of a bearing, especially using a roller bearing, wherein the bearing is accommodated in a stepped bore in the housing component, which especially extends through the housing component, a lid part seals the stepped bore, especially with respect to the outside, the lid part is frictionally connected to the housing component, the lid part is accommodated in the stepped bore, a surface section of the outside of the lid part is situated in alignment with a step of the stepped bore, in
(Continued)

particular in such a way that the surface section is situated on an axial position of the step.

27 Claims, 5 Drawing Sheets

(51) Int. Cl.
*F16H 57/029* (2012.01)
*F16H 57/021* (2012.01)
*F16H 57/025* (2012.01)
*F16H 57/03* (2012.01)
F16H 57/033 (2012.01)

(52) U.S. Cl.
CPC ......... *F16H 57/025* (2013.01); *F16H 57/029* (2013.01); *F16H 57/03* (2013.01); *F16H 57/033* (2013.01)

(56) References Cited

FOREIGN PATENT DOCUMENTS

| | | |
|---|---|---|
| CN | 202 360 724 | 8/2012 |
| DE | 70 02 942 | 7/1970 |
| DE | 10 2007 025 755 | 12/2008 |
| DE | 10 2007 058 918 | 6/2009 |
| DE | 10 2009 005 343 | 7/2010 |
| EP | 1 059 470 | 12/2000 |
| JP | 09-53705 | 2/1997 |
| JP | 2011-153640 | 8/2011 |
| WO | 2010/108602 | 9/2010 |

OTHER PUBLICATIONS

International Search Report, dated Jun. 6, 2014, issued in corresponding International Application No. PCT/EP2014/000235.

\* cited by examiner

BEARING SYSTEM AND GEAR UNIT

FIELD OF THE INVENTION

The present invention relates to a bearing system and a gear unit.

BACKGROUND INFORMATION

German Published Patent Application No. 10 2007 058 918 illustrates a gear unit having a bearing system.

SUMMARY

Therefore, the invention is based on the objective of further developing a bearing system and a gear unit with a view toward better environmental protection.

Important features of the present invention in the bearing system including a housing component, in which a shaft is supported with the aid of a bearing in the bearing component, especially using a roller bearing, are that the bearing is accommodated in a stepped bore in the housing component, which in particular extends through the housing component, a lid part seals the stepped bore, especially with respect to the outside, the lid part is frictionally connected to the housing component, the lid part is accommodated in the stepped bore, a surface section of the outside of the lid part is situated in alignment with a step of the stepped bore, in particular so that the surface section is situated on an axial position of the step.

This has the advantage that the bearing system in the housing component is able to be insulated from the environment with the aid of the lid part. The bearing system is therefore protectable from penetrating dirt particles, and the operational reliability can be improved.

The frictional connection of the lid part to the housing component is able to be established in an uncomplicated manner, so that the bearing system can be produced cost-effectively.

The lid part makes it possible to realize the bearing system in an oil-tight manner. The bearing system may therefore be used even in application fields that set high hygienic standards.

The surface section of the lid part is advantageously situated in alignment with the step. As a result, the surface section and the step define a plane, so that the housing component having the lid part is easy to clean.

In one advantageous development, the inner diameter, especially the inside diameter, of the stepped bore decreases monotonously in the bore direction, i.e., the axial direction, and therefore in particular in the direction of the shaft axis. This has the advantage that the lid part is easily able to be introduced into the stepped bore. A cost-effective installation is possible as a result.

The inner diameter of the bore advantageously decreases in the direction of the bearing.

In one advantageous development, the stepped bore has a step with a bevel. This is advantageous insofar as the step can be used as a stop for an installation tool for the lid part. The bevel facilitates the positioning of the lid part inside the stepped bore.

In one advantageous development, the axial position of the surface section is the axial position of the lid part that lies farthest from the bearing. This is advantageous insofar as the lid part is able to be introduced into the stepped bore with the aid of a conventional punching tool and be aligned in a flush manner with the step in the stepped bore. The punching tool has a circular planar punching surface having a diameter that is essentially identical with the maximum diameter of the stepped bore. As a result, the lid part is able to be pressed evenly into the stepped bore with the aid of the punching tool. Tilting of the lid part in the stepped bore is able to be prevented, so that the tightness of the connection between the lid part and the housing component is able to be improved.

In one advantageous development, a retaining ring is situated axially between the bearing and the lid part in a radially aligned annular groove of the stepped bore. This is advantageous insofar as the retaining ring delimits the bearing in the axial direction, so that the lid part is able to be spaced apart from the bearing. The reliability of the bearing system is therefore improved.

In one advantageous development, the retaining ring is set apart from the lid part. This is advantageous insofar as the risk of an installation error is able to be reduced. The spacing acts as tolerance range, so that in a deviation of the position of the lid part inside the stepped bore, a deformation of the lid part within this tolerance range is able to be prevented. This reduces the risk of an oil leak at the lid part and thus improves the operational reliability.

In one advantageous development, a spacer ring is axially situated between the retaining ring and an outer ring of the bearing, the retaining ring together with the spacer in particular delimiting the outer ring of the bearing in the axial direction. This has the advantage that an axial force acting on the bearing via the shaft is able to be absorbed by the spacer and the retaining ring. The spacer and the retaining ring therefore make it possible to delimit the shaft and the bearing in the axial direction.

In one advantageous development, the lid part is developed in the form of a cup, which advantageously allows the lid part to be produced in an uncomplicated manner. For example, the lid part is able to be produced as a punched and bent part.

In one advantageous embodiment, the lid part has a base section and a wall section. This is advantageous insofar as the wall section may be used for sealing the bearing system from the housing section. The shaft end is able to be covered by the base section.

In one advantageous development, the wall thickness of the wall section increases monotonously toward the base section. This has the advantage that an end region of the wall section facing away from the base section can be designed to be elastically deflectable. This makes it possible to improve the tightness of the connection between the lid part and the housing component.

In one advantageous development, the outer radius of the wall section increases linearly toward the base section in an axial end region facing the bearing, in particular. This has the advantage that a bevel is able to be realized on the end region, which simplifies the introduction of the lid part into the stepped bore.

In one advantageous development, the inner radius of the wall section becomes larger in a stepwise manner. This has the advantage that the stability of the wall section increases toward the base section. An end region of the wall section facing away from the bottom section thus is able to have greater elasticity than an end region of the wall section facing the bottom section. This simplifies the introduction of the lid part into the stepped bore and simultaneously makes it possible to achieve a reliable connection between the lid part and the housing component.

In one advantageous development, the lid part is developed as a sheet-metal part, especially a steel part, especially as a punched and bent part, the sheet-metal part being at least partially plastic-coated. This has the advantage that the lid part can be produced in an uncomplicated and cost-effective manner. The low wall thickness of sheet-metal parts, which in particular is less than 3 mm, facilitates the elastic deformability of the wall section, so that the installation of the lid part becomes easier.

In one advantageous development, the plastic is an elastomer. This is advantageous insofar as the elastomer makes it possible to protect the sheet-metal part of the lid part from damage, which increases the performance reliability.

In one advantageous development, the plastic coating is also situated radially between the sheet-metal part and the housing component, the plastic coating being elastically deformed, in particular so that the plastic coating seals the sheet-metal part with respect to the housing component. This has the advantage that an additional sealing means may be omitted, which makes it possible to reduce the production expense.

In one advantageous development, the radius of the shaft decreases in a stepwise manner in the direction of the bearing, a step in the shaft in particular being set apart from an inner ring of the bearing; the maximum outer radius of the shaft is greater than an inner radius of the inner ring, and a bushing is situated on the shaft. This has the advantage that axial forces acting on a toothed wheel situated on the shaft are transmittable to the bearing with the aid of the bushing, so that the loading of the shaft is able to be reduced. In particular the loading of the step developed on the shaft is able to be relieved, so that a breakout of the shaft is preventable. The operational reliability of the bearing system can therefore be improved.

In one advantageous development, the bushing touches the inner ring. This has the advantage that forces axially acting on the bushing are transmitted directly to the inner ring of the bearing with the aid of the bushing. This relieves the stress on the shaft.

In one advantageous development, an inner diameter of the bushing is greater than the inner diameter of the inner ring, the outer diameter of the bushing in particular being smaller than the outer diameter of the inner ring. This has the advantage that a force axially acting on the bushing is transmittable to the inner ring in its entirety. The complete radial surface of the bushing advantageously touches the inner ring, so that a reliable force transmission is able to be realized.

In one advantageous development, the bushing is situated axially between a toothed wheel connected to the shaft, and the inner ring. This has the advantage that axial forces and/or forces including an axial component, which are acting on the toothed wheel, are able to be shifted toward the bearing with the aid of the bushing. The loading of the shaft is therefore able to be reduced and the operational reliability improved.

In one advantageous development, at least one rolling element is situated between the inner ring and the outer ring of the bearing. This is advantageous insofar as a roller bearing provided with rolling elements is exposed to only minor rolling friction.

Important features of the present invention in the gear unit including a bearing system are that a housing of the gear unit encloses all toothed elements of the gear unit and accommodates the bearings of the gear unit, the housing having a frame section and a cladding section, the frame section and the cladding section in particular being developed in one piece and/or being connected in an integral fashion, the frame section having a greater wall thickness than the cladding section, the frame section having two outer leg sections and a center leg section.

This is advantageous insofar as the housing is able to be reinforced with the aid of the frame section. The toothed elements disposed inside the housing are protectable by the cladding section. This makes it possible to reduce the weight of the housing. A lightweight gear unit can be produced in a cost-effective manner because the material expense is able to be lowered. In addition, the ability to transport and position the gear unit can be improved, which also results in better environmental protection because material and energy are able to be saved.

In one advantageous development, each outer leg section is disposed at a nonvanishing angle with respect to the center leg section, the outer leg sections and the center leg section being situated in a U-shape, in particular. This has the advantage that the reinforcing frame section extends across three sides of the housing. The torsional stiffness of the housing is therefore able to be improved.

In one advantageous development, at least one outer leg section has at least one annular section, the annular section in particular being developed in one piece with the outer leg section. This has the advantage that a bearing for support of a shaft of the gear unit can be accommodated in the annular section. Forces acting on the bearing are therefore able to be absorbed by the outer leg section.

In one advantageous development, the center leg section includes a support section, the support section in particular being developed in one piece with the center leg section. This is advantageous insofar as the housing is able to be supported with the aid of the support section. The integral development of the support section with the center leg section is especially advantageous because a firm connection between the support section and the center leg section is able to be realized. The risk that the support section breaks away from the center leg section is reducible, which increases the performance reliability.

In one advantageous development, a ring is connected to the annular section, especially in a releasable manner, the ring in particular being screwed into the annular section, and the housing is situated on a bracket element so as to be at least partially supported, the bracket element having a depression, especially on its upper side, in order to accommodate the ring, the bracket element forming a seat for the ring, in particular. This has the advantage that the housing is able to rest on the bracket element. The bracket element may have a vibration-damping design, so that the housing is able to positioned in a vibration-damped manner. This makes it possible to extend the service life of the gear unit.

The ring is advantageously able to be mounted on different annular segments in an uncomplicated manner. The position of the bracket element thus is easily adaptable to the application. The number of components can be reduced and the environment protection be improved.

In one advantageous development, a partial ring, especially a half ring, is connected to the bracket element, especially by means of screws. This has the advantage that the ring can be attached to the bracket element with the aid of the partial ring. The bracket element can therefore absorb the weight force of the gear unit as well as torsional forces acting on the gear unit.

In one advantageous development, the ring is retained in a keyed connection between the partial ring and the bracket element, especially interposed and/or clamped. This is advantageous insofar as the ring is able to be fixed in place on the bracket element over a large surface and thus in a reliable manner.

In one advantageous development, a plane is defined by the outer leg sections and the center leg section, the plane in particular being aligned horizontally and/or essentially in parallel with respect to a base surface of the housing. This has the advantage that the mass of the housing, which is primarily concentrated in the frame section, is evenly distributable in the horizontal direction. As a result, the torsional stiffness of the housing is able to be improved even further.

In one advantageous development, the wall thickness of the frame section is greater than in any other region of the housing. This has the advantage that the stiffness of the housing is improvable, while the mass of the housing is able to be reduced at the same time, so that savings in material are possible.

In one advantageous development, at least one annular section of each outer leg section has at least one bearing seat in each case, in which a bearing is accommodated in order to support at least one shaft of the gear unit. This has the advantage that the bearing seats are able to be implemented in a stable and secure manner by the annular sections. Forces acting on the bearings and thus the bearing seats by the shafts supported in the bearings are able to be absorbed by the frame section, which makes it possible to improve the operational reliability of the gear unit.

In one advantageous development, an output shaft of the gear unit is supported in annular sections of the outer leg sections with the aid of bearings. This is advantageous insofar as the output shaft, which transmits the torque to the application connected to it, is able to be supported in a secure manner. Even forces that are transmitted from the application to the output shaft are absorbable with the aid of the frame section.

In one advantageous development, the support section overhangs the center leg section, in particular as an outwardly directed protuberance, and/or projects from it, the support section in particular being developed in the form of a tab on the center leg section, and the support section being connected, especially in a releasable manner, to a support element, in particular by a screw connection. This is advantageous inasmuch as the support element can be used as torque support, so that torsional forces acting on the gear unit are able to be absorbed by the support element. The support element may be placed on a foundation or a support structure. Moreover, the support element may be equipped with a damping element, so that the housing can be positioned in a damped manner.

In one advantageous development, the support section has a bore, the bore direction running perpendicularly to the plane spanned by the outer leg sections and the center leg section. This is advantageous inasmuch as a screw or a pin or a recessed bolt is able be guided through the bore in order to connect the support element and the support section, so that the connection can be implemented in an uncomplicated manner. The perpendicular alignment of the bore in particular makes it possible for the support element to absorb transverse forces.

The bore direction is advantageously aligned in parallel with the normal vector of this plane.

In one advantageous development, a clutch housing is connected to the frame section, the outer circumference of the clutch housing tapering toward the housing, and/or the outer diameter of the clutch housing decreasing toward the housing, the clutch housing in particular being implemented in conical form and/or essentially as a cone, and a step is developed in the inner diameter of the clutch housing in the direction of the housing, so that the wall thickness of the clutch housing increases in a stepwise manner, axial bores in particular being implemented in the step in the circumferential direction, and screws being guided through the bores in order to connect the clutch housing to the housing. This is advantageous insofar as the clutch housing, which accommodates a clutch for connecting a motor shaft to the input shaft of the gear unit, surrounds the clutch in the form of a housing, so that the clutch is able to be protected from contamination. In addition, the safety of the gear unit is able to be improved because foreign bodies are unable to get trapped in the clutch.

In one advantageous development, a subsection of the clutch housing has a greater wall thickness than other areas of the clutch housing. This has the advantage that the torsional stiffness of the clutch housing can be improved.

In one advantageous development, a motor is connected to the housing with the aid of the clutch housing, which has the advantage that the motor can be held by the clutch housing, so that no additional retaining device for the motor is needed. This results in fewer components, so that the linkage of the motor is able to be realized in a cost-effective manner.

In one advantageous development, the subsection axially extends from the housing to the motor and covers an angle range at circumference of less than 90° and/or is restricted in the circumferential direction. This advantageously makes it possible to achieve high torsional stiffness at a reduced outlay in material.

In one advantageous development, the frame section is continued by the subsection in the clutch housing. This is advantageous inasmuch as the clutch housing is alignable with the frame section, so that the weight force of the motor is transmittable to the reinforced frame section and a breakaway of the thinner cladding section is preventable.

In one advantageous development, the subsection has a bore, which is sealed with the aid of a sealing part, the bore in particular being sealed in a tight and reversible manner by an inspection lid. This is advantageous inasmuch as the clutch located inside the clutch housing can be inspected through the inspection opening. This improves the reliability of the clutch.

In one advantageous development, an input shaft of the gear unit extends from the clutch housing through the first and second outer leg sections. This has the advantage that the input shaft of the gear unit is easily connectible to the motor shaft at both ends of the shaft.

In one advantageous development, the input shaft is at least partially guided through two annular sections. This has the advantage that the bearings of the shaft are able to be placed into the annular sections, so that the gear unit may have a compact design.

In one advantageous development, an end region of the input shaft facing away from the clutch housing is connected to a brake device. This has the advantage that if braking takes place, the stress on the toothed elements of the gear unit is able to be relieved since the brake device is connected directly to the motor via the input shaft.

In one advantageous development, the cladding section includes a reinforcement segment. The extension, especially the height, of the housing decreases monotonously from the output shaft of the gear unit to the input shaft of the gear unit in a direction perpendicular to the axis of the output shaft and perpendicularly to the outer leg sections, and in particular decreases linearly in a longitudinal section of the housing parallel to an outer leg section. In particular, a normal vector of the essentially planar reinforcement surface section stands at a nonvanishing angle in relation to a normal vector of the plane defined by the outer leg sections and the center leg section. This has the advantage that the torsional stiffness of the housing can be improved with the aid of the reinforcement area section. The reinforcement area section functions as an integrated torque support for the gear unit, so that an additional torque support can be saved and the gear unit is able to be produced in a cost-effective manner.

Further advantages are derived from the dependent claims. The present invention is not restricted to the feature combination of the claims. Those skilled in the art will discover additional meaningful combination possibilities of claims and/or individual claim features and/or features of the specification and/or of the figures, that arise from the stated objective and/or the objective resulting from a comparison with the related art, in particular.

DETAILED DESCRIPTION

Figure 1:
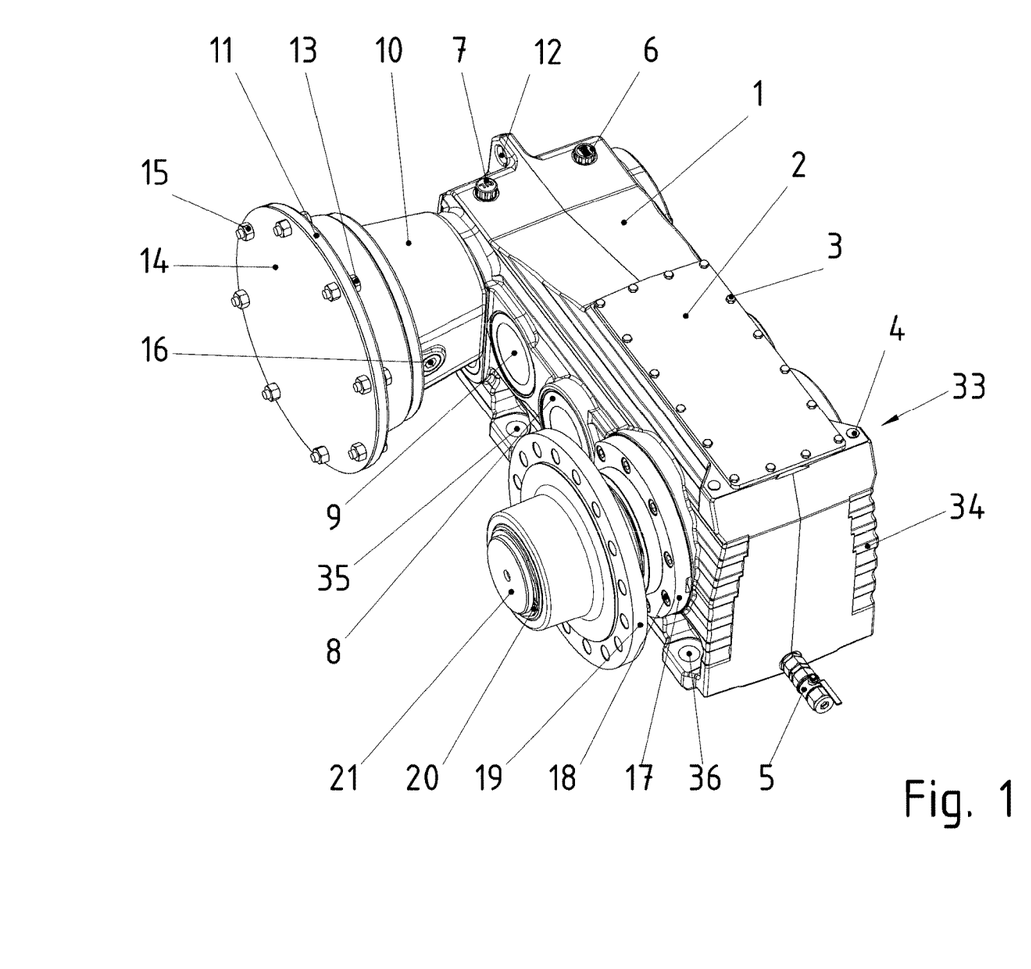
FIG. 1 shows an oblique view of a gear unit according to the present invention.
Figure 2:
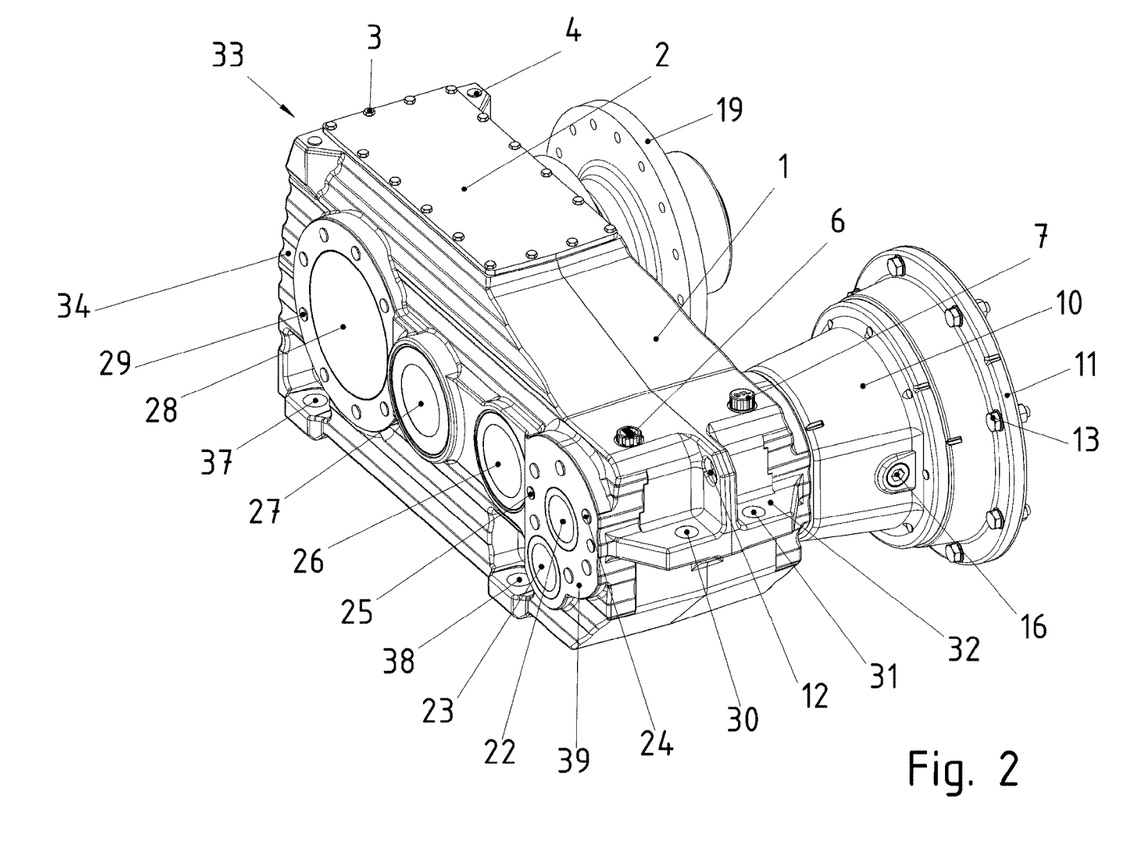
FIG. 2 shows the gear unit according to the invention in a further oblique view.

The gear unit according to the present invention shown in FIGS. 1 and 2 has a housing 33, in which toothed wheels and shafts (not shown) are situated.

Housing 33 is realized in one piece or as one part and in essentially rectangular form and preferably produced as a cast component. Housing 33 has a reinforcement surface section 1, and a plane including reinforcement surface section 1 intersects a plane that encompasses a base area of housing 33 at a nonvanishing angle which is smaller than 90°. The height of housing 33 thus decreases in linear fashion in a direction along reinforcement surface section 1. The height in the area of an output shaft 21 is greater than the height in the area of an input shaft. Here, the height of housing 33 is defined as the extension of the housing perpendicularly to the direction of the shaft axis and perpendicularly to a plane that includes an input shaft and an output shaft 21 of the gear unit.

Adjacent to reinforcement surface section 1 housing 33 has an uninterrupted recess (not shown), which is sealed by an in particular rectangular lid part 2. Lid part 2 is connected to housing 33 by fastening means 3, preferably implemented as screws, and guided through bores in lid part 2 and screwed into tapped holes in housing 33. The recess is large enough to introduce toothed wheels through the recess and into housing 33.

On the bottom area lying across from lid part 2 there is at least one connection surface having a bore (35, 36, 37, 38). A fastening means, in particular a screw or a threaded rod, can be guided through the bore (35, 36, 37, 38) in order to connect housing 33 to a support element (not shown) or a hall floor. The connection surface is disposed essentially parallel to the floor surface for this purpose. The bore (35, 36, 37, 38) preferably extends parallel to the normal vector of the connection surface.

Housing 33 has a surface section 34 for attaching an integrally formed three-dimensional mark. Surface section 34 is provided with wavelike structures for this purpose.

To connect a clutch housing to housing 33, housing 33 has a connection surface 39, which surrounds an uninterrupted bore for accommodating a bearing part of an input shaft (not shown) of the gear unit. Connection surface 39 is essentially circular in a plane of housing 33, the circular form being flattened on two sides, i.e., being partially developed in a linear fashion in circumferential direction. At least one tapped hole 24 and at least one center bore 25 are disposed in connection surface 39, which are situated on a circular arc surrounding the bore. The bore is sealed with the aid of a lid part 22. Lid part 22 is frictionally connected to housing 33 for this purpose.

Also disposed in connection surface 39 is a second uninterrupted bore for accommodating a bearing part. Connection surface 39 thus likewise surrounds the second bore. Toward this end, the outer contour of connection surface 39 deviates from the circular form in the region of the second bore and has a bulge. The second bore is sealed with the aid of a lid part 23. Lid part 23 is frictionally connected to housing 33 for this purpose.

On the side of housing 33 situated opposite the connection surface 39 there is another connection surface. The further connection surface is developed essentially in mirror symmetry with connection surface 39. That is to say, it has two uninterrupted bores, tapped holes and at least one center bore. One bore is sealed by a lid part. A bearing is accommodated in the bore. Guided through the bore in the other connection surface is the input shaft of the gear unit.

A clutch housing for a clutch (not shown), in particular a dog clutch, is joined, in particular screw-fitted, to the gear unit with the aid of the further connection surface. The clutch housing is essentially conical and its diameter tapers in the direction of the gear unit.

The clutch housing has a flange section 10 and a connection section 11. Flange section 10 is disposed between the connection surface and connection section 11. A sectional surface of flange section 10 parallel to the planar connection surface deviates from the circular base area of the connection flange. The sectional surface is flattened on two sides, so that flange section 10 is at least partially able to be brought in congruence with the connection surface.

The flattened subsection of flange section 10 has a greater wall thickness than other areas of flange section 10. The subsection extends from housing 33 to connection section 11.

Flange section 10 has at least one bore, which is sealed by a sealing part 16. Sealing part 16 is screwed to flange section 10. Sealing part 16 is situated in a flattened subsection of flange section 10. The bore in the flange section functions as an inspection opening. As a result, the dog clutch disposed inside the clutch housing is able to be inspected.

Connection section 11 is connected to flange section 10, preferably by screws. Connection section 11 includes bores for a connection to a connection flange of a motor (not shown). For transporting the gear unit, connection section 11 is sealed by a cover element 14. Bores are provided in cover element 14 for this purpose. Cover element 14 is connected to connection section 11 by screws 13 which are threaded through the bores.

In one further exemplary embodiment, which is not shown, flange section 10 and connection section 11 are developed in one piece and/or integrally formed, in particular in the form of a single cast component.

The clutch housing is optionally able to be connected to connection surface 39 or the further connection surface. Connection section 11 may be used for connecting the clutch housing to a housing of a motor (not shown). For this purpose the inner diameter of the clutch housing increases toward housing 33 in a stepped manner. The clutch housing thus includes a step. Axial bores are situated in this step in the circumferential direction, through which connection screws (not shown) can be guided in order to connect the clutch housing to housing 33.

The gear unit has an output shaft 21. Output shaft 21 is guided through a bore in housing 33. A ring 17 is connected to housing 33 by at least one fastening means 18, especially using screws, which are screwed into tapped holes in housing 33. The output shaft is guided through ring 17.

A flange coupling 19 is connected to shaft 21. With the aid of an adjusting spring and/or press-fit connection, flange coupling 19 is connected to shaft 21 in a keyed connection and/or with an interference fit and is situated at a distance from ring 17. A retaining ring 20 situated on shaft 21 fixates the flange coupling in the axial direction of shaft 21. Flange coupling 19 is provided with bores for connecting an application (not shown) to the gear unit.

On the side of housing 33 situated opposite flange coupling 19 there is another uninterrupted bore in housing 33. A bearing as support for output shaft 21 is situated in this bore. Tapped holes 29 are disposed essentially in the circumferential direction around this bore in housing 33. The bore can be sealed with the aid of a lid part 28, for which purpose lid part 28 is frictionally connected to housing 33. As a result, output shaft 21 is optionally also able to be placed on the opposite side of housing 33.

On two sides of housing 33, at least two uninterrupted bores are situated in housing 33 in each case, between the bore for the input shaft and the bore for the output shaft. Bearings for supporting shafts and toothed wheels disposed inside housing 33 are situated in these bores. The bores are sealed by lid parts (8, 9, 26, 27). The lid parts (8, 9, 26, 27) are frictionally connected to housing 33 for this purpose.

Housing 33 has a support section 32 on a short side surface. Support section 32 is developed as a bracket in housing 33. Bores (30, 31) for connecting housing 33 to a support device (not shown) are developed in support section 32.

Support section 32 defines a plane with the shaft axes of the input and output shaft and the shaft axis of at least one intermediate shaft (not shown). This plane is aligned horizontally, and preferably disposed essentially in parallel with the base area of housing 33.

The distance between support section 32 and the input shaft of the gear unit is smaller than the distance between support section 32 and output shaft 21 of the gear unit.

Housing 33 includes an oil dipstick 7 and a ventilation means 6, which are situated on the upper side of housing 33. Oil dipstick 7 is provided for measuring the volume of a lubricant, preferably oil, inside housing 33.

An oil discharge means 5 is situated on housing 33. Oil discharge means 5 is disposed on a short side of housing 33. Oil discharge means 5 is situated on a side of the housing that lies across from support section 32.

At least one tapped hole 4 is disposed in the surface of housing 33. A ring bolt (not shown) can be screwed into this tapped hole when transporting the gear unit. Another bracket having a bore 12 is situated at a right angle to support section 32, the bore being developed as a transport tab.

Figure 3:
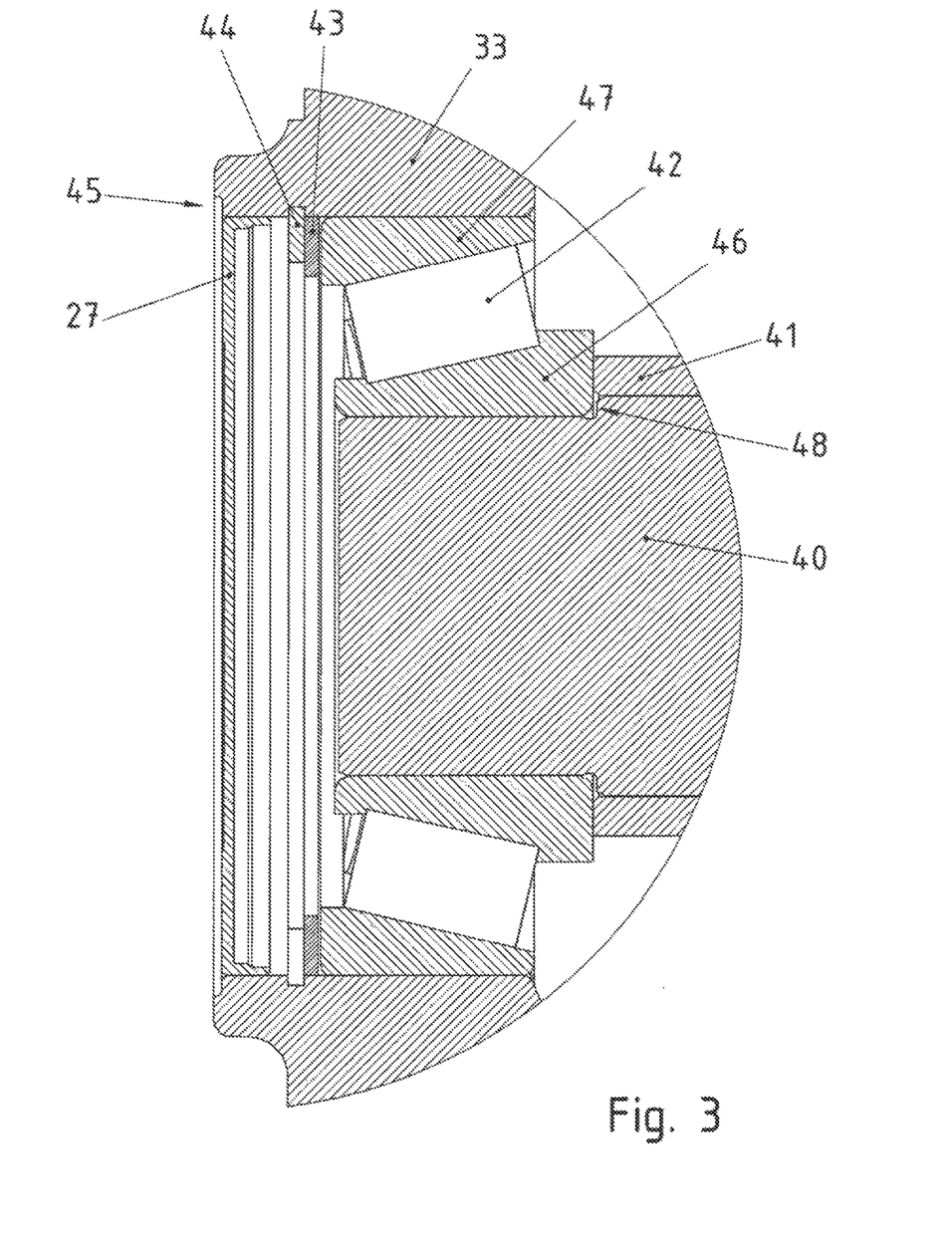
FIG. 3 shows a sectional view of a bearing system having a lid part according to the invention.

A shaft 40, shown in FIG. 3, of the gear unit is supported by a bearing in housing 33 of the gear unit. The bearing is situated in a continuous stepped bore in housing 33, and a retaining ring 44 situated in an annular groove in the stepped bore delimits the bearing the the direction of the shaft axis. A spacer ring 43 is disposed between the bearing and retaining ring 44 in the direction of the shaft axis.

The radius of shaft 40 tapers in the direction of the bearing. The shaft radius has a step 48, so that the radius of a shaft section in the bearing is smaller than the radius of a shaft section set apart from the bearing. Step 48 is spaced apart from the bearing, and step 48 is spaced apart from an inner ring 46, in particular. A bushing 41 sits on shaft 40, the bushing touching inner ring 46. Bushing 41 is axially situated between the bearing and a toothed wheel (not shown).

The stepped bore in housing 33 is sealed by a lid part 27 on its side facing away from shaft 40. Lid part 27 is frictionally connected to housing 33 for this purpose. Lid part 27 is implemented as a sheet-metal part, in particular as a steel plate, preferably as a punched-bent component. Lid part 27 is at least partially coated with plastic. An elastomer is used as plastic. The sheet-metal part is preferably precisely as thick as the plastic coating up to four times as thick as the plastic coating, preferably twice as thick as the plastic coating, the sheet-metal part in particular being approximately 1 mm thick and the plastic coating being approximately 0.5 mm thick.

Lid part 27 has the shape of a cup and includes a base section and a wall section. The wall thickness of the wall section increases monotonously in the direction of the base section. The inner diameter of the wall section increases in a stepwise manner, preferably using a single step. An end region, facing the bearing, of the outer diameter of the wall section is provided with a bevel. In other words, the outer radius of the wall section is constant and in the end region decreases linearly towards the shaft in the axial direction.

The side of the wall section facing housing 33 is coated with plastic. The plastic thus is situated between housing 33 and the sheet-metal part of lid part 27. The side of the lid part facing away from housing 33 is likewise coated with plastic.

The stepped bore includes a step 45 and a bevel. Step 45 is provided in an axial position region of the stepped bore, which includes the bevel.

To seal the stepped bore, lid part 27 thus is pressed into the stepped bore. The lid part is pressed into the stepped bore with the aid of a tool in such a way that a surface section of the outer side of lid part 27 adjoins step 45 in a flush manner. Step 45 and the surface section thus lie in one plane.

The beveled end region of the wall of the lid part is threaded into the stepped bore and the wall of lid part 27 is elastically deformed in the process, so that a frictional connection is produced between lid part 27 and housing 33. The plastic coating of the lid part is likewise elastically deformed and acts as a seal with respect to housing 33.

Figure 4:
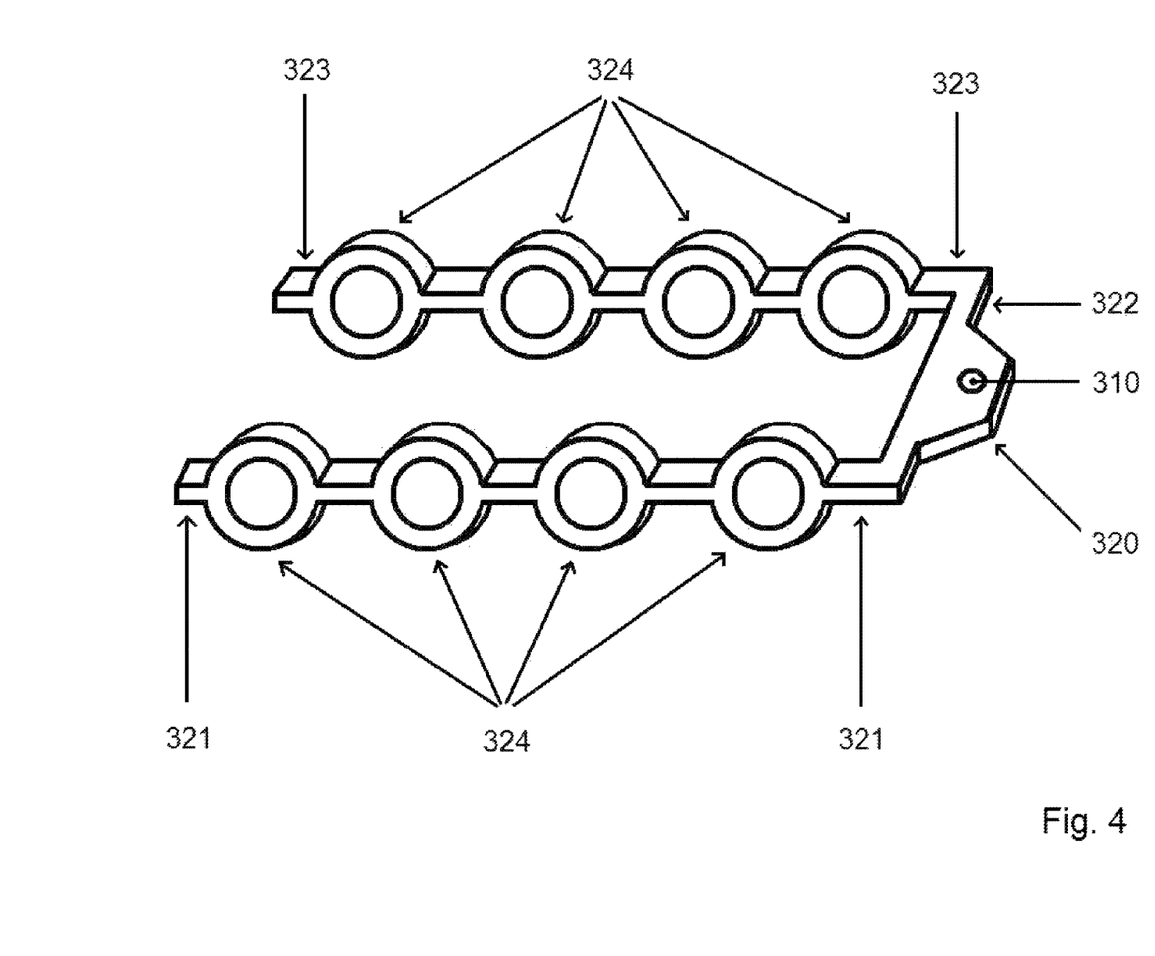
FIG. 4 shows a schematic representation of a frame section of the gear unit according to the invention.
Figure 5:
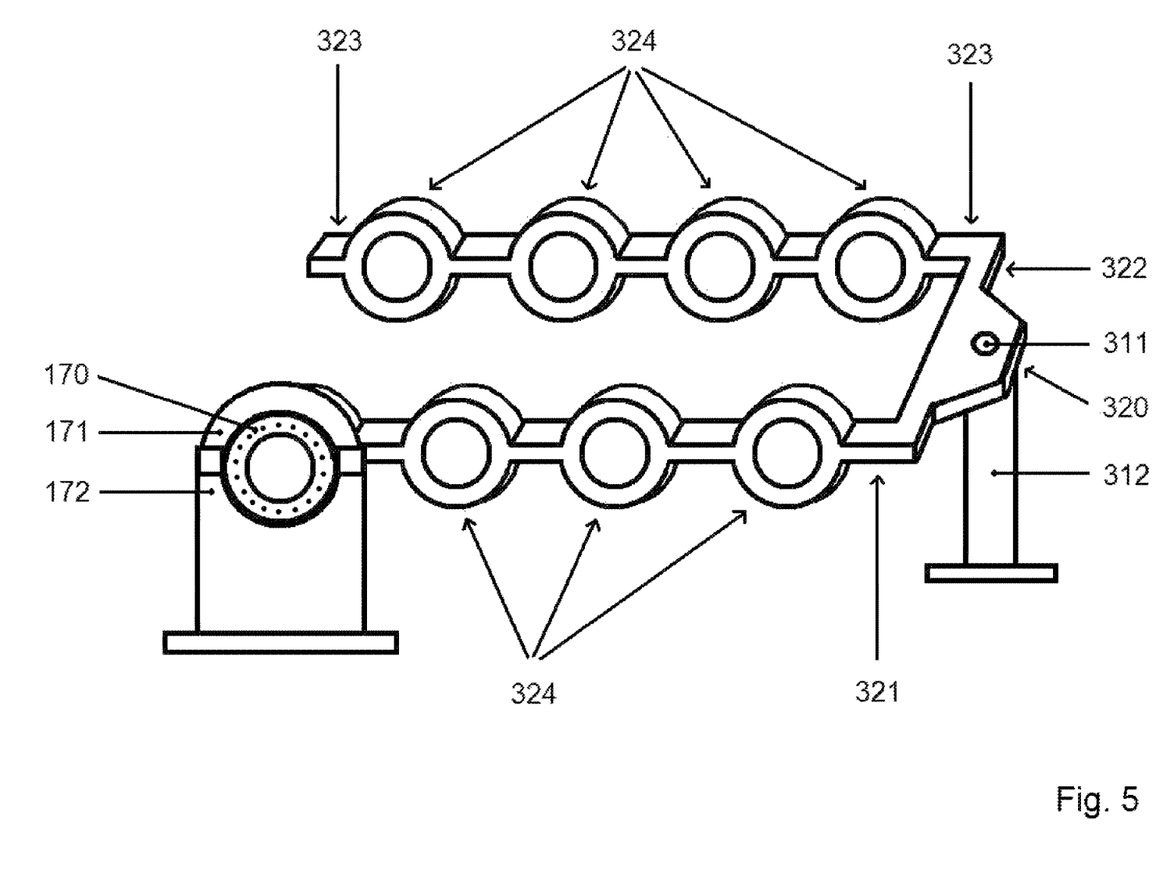
FIG. 5 shows a schematic view of a seat of the frame section.

Housing 33 has a frame section, which is shown in FIGS. 4 and 5, and a cladding section. The wall thickness of the frame section is greater than the wall thickness of the cladding section. The frame section thus stiffens housing 33 and accommodates the bearings of the gear unit, acting as a support section, while the cladding section at least partially surrounds the toothed elements located inside the housing in the form of a housing.

The frame section has a center leg section 322 and two outer leg sections (321, 323). It is preferably developed in one piece. The center leg section 322 is situated between the outer leg sections (321, 323). The outer leg sections (321, 323) are situated at a nonvanishing angle with respect to center leg section 322 in each case. The outer leg sections (321, 323) and the center leg section are preferably disposed in a U-shape.

Each the outer leg section (321, 323) has at least one annular section 324, in which at least one bearing for support of the toothed elements of the gear unit are situated. The individual annular section 324 therefore is developed as one part, i.e., in one piece with the individual outer leg section (321, 323).

A ring 170 is connected to annular section 324 in a detachable manner, preferably with the aid of screws. Ring 170 has axial bores situated in the circumferential direction for this purpose, through which screws are fed in order to connect to tapped holes situated in annular section 324.

Ring 170 lies on a support element 172. For this purpose support element 172 includes a depression developed as a concavity on its upper side facing ring 17. A partial ring 171 is detachably connected to support element 172, in particular using a screw connection. Ring 170 is interposed between partial ring 171 and support element 172, ring 170 in particular being fixed in place on support element 172 by partial ring 171. The weight of the gear unit and the motor (not shown) connected to the gear unit, and/or the application (not shown) connected to the gear unit is born at least partially by support element 172.

Partial ring 171 thus functions as a retaining clamp for support element 172. Partial ring 171 delimits ring 170 in the axial direction. Support element 172 and partial ring 171 thus are connected to ring 170 in a keyed connection. The connection of support element 172 and partial ring 171 to ring 170 preferably includes play.

Center leg section 323 includes a support section 320 implemented as a bracket. Support section 320 is formed in one part with center leg section 323. Support section 320 has a bore 310, the bore direction being parallel to the normal vector of a plane defined by the frame section. Using connection means 311, guided through the bore, support section 320 is connected to a support element 312, preferably via a screw connection.

Support part 321 and support element 172 are joined at least indirectly to a foundation or a support structure, such as by a screw connection.

In another exemplary embodiment, which is not shown, housing 33 is provided with a coat of lacquer. The coat of lacquer extends to the lid parts (8, 9, 22, 23, 26, 27, 28), lid part 2, ring 17, flange coupling 19, flange section 10, and/or cover element 14.

In one further exemplary embodiment, which is not shown, the input shaft is guided through a bore in connection surface 39, so that the input shaft projects from housing 33 on two sides of housing 33. On the side of housing 33 facing away from the motor, an external brake is connectable to the input shaft.

LIST OF REFERENCE NUMERALS 1 reinforcement surface section
2 lid part
3 fastening means
4 tapped hole
5 oil discharge means
6 ventilation means
7 oil dipstick
8 lid part
9 lid part
10 flange section
11 connection section
12 bore
13 fastening means
14 cover element
15 fastening means
16 sealing part
17 ring
18 fastening means
19 flange coupling
20 retaining ring
21 shaft
22 lid part
23 lid part
24 tapped hole
25 center bore
26 lid part
27 lid part
28 lid part
29 tapped hole
30 bore
31 bore
32 support section
33 housing
34 surface section
35 bore
36 bore
37 bore
38 bore
39 connection surface
40 shaft
41 bushing
42 rolling element
43 spacer ring
44 retaining ring
45 step
46 inner ring
47 outer ring
48 step
170 ring
171 partial ring
172 support element
310 bore
311 connection means
312 support element
320 support section
321 outer leg section
322 center leg section
323 outer leg section
324 annular section

The invention claimed is:
1. A gear unit, comprising:
a bearing system that includes:
a housing component;
a bearing;
a shaft supported in the housing component with the aid of a bearing, wherein:
the bearing is accommodated in a stepped bore in the housing component, and
the stepped bore extends through the housing component; and
a lid part that seals the stepped bore and is frictionally connected to the housing component, the lid part being accommodated in the stepped bore, wherein a surface section of an outer side of the lid part is in flush alignment with a step of the stepped bore, wherein:

a housing of the gear unit surrounds all toothed elements of the gear unit and accommodates bearings of the gear unit, the housing includes a frame section and a cladding section, the frame section and the cladding section being at least one of developed in one piece and connected in an integral fashion, the frame section includes a greater wall thickness than the cladding section, the frame section includes two outer leg sections and a center leg section, each outer leg section is situated at a nonvanishing angle to the center leg section, at least one outer leg section includes at least one annular section, the annular section is developed in one piece with the outer leg section, the center leg section includes a support section, and the support section is developed in one piece with the center leg section;

a clutch housing connected to the frame section, wherein:

an outer circumference of the clutch housing tapers in a direction of the housing, and a step is provided in an inner diameter of the clutch housing toward the housing, so that a wall thickness of the clutch housing increases in a stepwise manner.

2. The gear unit as recited in claim 1, wherein the bearing is a roller bearing.

3. The gear unit as recited in claim 1, wherein the lid part seals the stepped bore with respect to an outside.

4. The gear unit as recited in claim 1, wherein the outer side is in flush alignment with the step so that the surface section is disposed on an axial position of the step.

5. The gear unit as recited in claim 1, wherein an inner diameter of the stepped bore decreases monotonously in a bore direction corresponding to an axial direction and in a direction of a shaft axis.

6. The gear unit as recited in claim 5, wherein the step of the stepped bore includes a bevel.

7. The gear unit as recited in claim 5, wherein the inner diameter is an inside diameter.

8. The gear unit as recited in claim 1, wherein an axial position of the surface section is an axial position of the lid part that lies farthest from the bearing.

9. The gear unit as recited in claim 1, further comprising:

a retaining ring axially situated between the bearing and the lid part, inside a radially oriented annular groove of the stepped bore.

10. The gear unit as recited in claim 9, wherein:

the retaining ring is set apart from the lid part.

11. The gear unit as recited in claim 9, further comprising:

a spacer ring situated axially between the retaining ring and an outer ring of the bearing, wherein the retaining ring together with the spacer ring axially delimits the outer ring of the bearing.

12. The gear unit as recited in claim 1, wherein:

the lid part is in the form of a cup, the lid part includes a base section and a wall section, a wall thickness of the wall section increasing monotonously in a direction of the base section, an outer radius of the wall section increasing linearly toward the base section in an axial end region facing the bearing, and an inner radius of the wall section increasing in a stepwise manner.

13. The gear unit as recited in claim 1, wherein:

the lid part includes a sheet-metal part, the sheet-metal part is at least partially coated with a plastic coating, the plastic coating is situated radially between the sheet-metal part and the housing component, and the plastic coating is elastically deformed in such a way that the plastic coating seals the sheet-metal part with respect to the housing component.

14. The gear unit as recited in claim 13, wherein:

the sheet-metal part includes a steel plate that is a punched and bent part.

15. The gear unit as recited in claim 13, wherein the plastic coating includes an elastomer.

16. The gear unit as recited in claim 13, wherein:

a radius of the shaft decreases toward the bearing in a stepwise manner, a step in the shaft is set apart from an inner ring of the bearing, a maximum outer radius of the shaft is greater than an inner radius of the inner ring, a bushing is situated on the shaft and touches the inner ring, an inner diameter of the bushing is greater than the inner diameter of the inner ring, an outer diameter of the bushing is smaller than the outer diameter of the inner ring, the bushing is axially situated between a toothed wheel connected to the shaft and the inner ring, and at least one rolling element is situated between the inner ring and an outer ring of the bearing.

17. The gear unit as recited in claim 1, wherein the outer leg sections and the center leg section are situated in a U-shape.

18. The gear unit as recited in claim 1, wherein at least one of:

a plane is defined by the outer leg sections and the center leg section, the plane being aligned at least one of horizontally and essentially parallel to a base surface of the housing, the wall thickness of the frame section is greater than in any other region of the housing, and at least one annular section of each outer leg section has at least one bearing seat in each case, in which a bearing is accommodated for support of at least one shaft of the gear unit, an output shaft of the gear unit being supported with the aid of bearings in the annular sections of the outer leg sections.

19. The gear unit as recited in claim 1, wherein:

the support section at least one of overhangs the center leg section as an outwardly directed protrusion and projects therefrom, the support section being realized as a tab on the center leg section, the support section is connected to a support element in a detachable manner, and the support section has a bore, a bore direction being implemented perpendicularly to a plane spanned by the outer leg sections and the center leg section.

20. The gear unit as recited in claim 1, wherein:

the cladding section includes a reinforcement surface section, an extension of the housing decreases monotonously from an output shaft of the gear unit to an input shaft of the gear unit in a direction perpendicular to an axis of the output shaft and perpendicularly to the outer leg sections, a normal vector of the essentially planar reinforcement surface section stands at a nonvanishing angle to a normal vector of a plane defined by the outer leg sections and the center leg section.

21. The gear unit as recited in claim 20, wherein:
the extension is a height of the housing,
the extension decreases linearly in a longitudinal section of the housing parallel to at least one of the outer leg sections.

22. A gear unit, comprising:
a bearing system that includes:
a housing component;
a bearing;
a shaft supported in the housing component with the aid of a bearing, wherein:
the bearing is accommodated in a stepped bore in the housing component, and
the stepped bore extends through the housing component;
a lid part that seals the stepped bore and is frictionally connected to the housing component, the lid part being accommodated in the stepped bore, wherein a surface section of an outer side of the lid part is in flush alignment with a step of the stepped bore, wherein:
a housing of the gear unit surrounds all toothed elements of the gear unit and accommodates bearings of the gear unit,
the housing includes a frame section and a cladding section, the frame section and the cladding section being at least one of developed in one piece and connected in an integral fashion,
the frame section includes a greater wall thickness than the cladding section,
the frame section includes two outer leg sections and a center leg section,
each outer leg section is situated at a nonvanishing angle to the center leg section,
at least one outer leg section includes at least one annular section,
the annular section is developed in one piece with the outer leg section,
the center leg section includes a support section, and
the support section is developed in one piece with the center leg section;
a ring connected to the annular section in a releasable manner by screws;
a support element on which the housing is situated so as to be at least partially supported, wherein the support element includes a depression on an upper side of the support element in order to accommodate the ring, the support element forming a seat for the ring;
a partial ring connected to the support element, wherein the ring is retained in a keyed connection between the partial ring and the support element.

23. The gear unit as recited in claim 22, wherein the partial ring is a half ring.

24. The gear unit as recited in claim 22, wherein the partial ring is connected to the support element by screws.

25. The gear unit as recited in claim 22, wherein the ring is retained at least one of by being interposed and by being clamped.

26. A gear unit, comprising:
a bearing system that includes:
a housing component;
a bearing;
a shaft supported in the housing component with the aid of a bearing, wherein:
the bearing is accommodated in a stepped bore in the housing component, and
the stepped bore extends through the housing component;
a lid part that seals the stepped bore and is frictionally connected to the housing component, the lid part being accommodated in the stepped bore, wherein a surface section of an outer side of the lid part is in flush alignment with a step of the stepped bore, wherein:
a housing of the gear unit surrounds all toothed elements of the gear unit and accommodates bearings of the gear unit,
the housing includes a frame section and a cladding section, the frame section and the cladding section being at least one of developed in one piece and connected in an integral fashion,
the frame section includes a greater wall thickness than the cladding section,
the frame section includes two outer leg sections and a center leg section,
each outer leg section is situated at a nonvanishing angle to the center leg section,
at least one outer leg section includes at least one annular section,
the annular section is developed in one piece with the outer leg section,
the center leg section includes a support section, and
the support section is developed in one piece with the center leg section;
a clutch housing connected to the frame section, wherein at least one of:
an outer circumference of the clutch housing tapers in a direction of the housing,
the outer diameter of the clutch housing decreases in the direction of the housing, and
the clutch housing is at least one of conical and developed essentially as a cone;
a step developed in an inner diameter of the clutch housing toward the housing, so that a wall thickness of the clutch housing increases in a stepwise manner, axial bores being implemented in the step in a circumferential direction, with screws being fed through the bores for connecting the clutch housing to the housing, wherein a subsection of the clutch housing having a greater wall thickness than other areas of the clutch housing;
a motor connected to the housing with the aid of the clutch housing, the subsection extending axially from the housing to the motor and at least one of covering an angle at circumference range of less than 90° and being delimited in the circumferential direction, the frame section being continued by the subsection in the clutch housing, and the subsection having a bore, which is sealed with the aid of a sealing part, the bore being sealed by an inspection lid in a tight and reversible manner.

27. A gear unit, comprising:
a bearing system that includes:
a housing component;
a bearing;
a shaft supported in the housing component with the aid of a bearing, wherein:
the bearing is accommodated in a stepped bore in the housing component, and
the stepped bore extends through the housing component;

a lid part that seals the stepped bore and is frictionally connected to the housing component, the lid part being accommodated in the stepped bore, wherein a surface section of an outer side of the lid part is in flush alignment with a step of the stepped bore, wherein:
- a housing of the gear unit surrounds all toothed elements of the gear unit and accommodates bearings of the gear unit,
- the housing includes a frame section and a cladding section, the frame section and the cladding section being at least one of developed in one piece and connected in an integral fashion,
- the frame section includes a greater wall thickness than the cladding section,
- the frame section includes two outer leg sections and a center leg section,
- each outer leg section is situated at a nonvanishing angle to the center leg section,
- at least one outer leg section includes at least one annular section,
- the annular section is developed in one piece with the outer leg section,
- the center leg section includes a support section, and
- the support section is developed in one piece with the center leg section;

an input shaft extending from the clutch housing through the first and second outer leg sections, wherein:
- the input shaft at least partially is fed through two annular sections, and
- an end region of the input shaft facing away from the clutch housing is connected to a brake device.

* * * * *